(12) United States Patent
Zhu et al.

(10) Patent No.: US 9,749,872 B2
(45) Date of Patent: Aug. 29, 2017

(54) METHOD FOR SHARING FREQUENCY SPECTRUM BETWEEN NETWORKS

(71) Applicant: SHANGHAI RESEARCH CENTER FOR WIRELESS COMMUNICATIONS, Shanghai (CN)

(72) Inventors: Yuanping Zhu, Shanghai (CN); Jiang Wang, Shanghai (CN); Qiaoling Yu, Shanghai (CN); Yong Teng, Beijing (CN); Kari Horneman, Oulu (FI)

(73) Assignee: SHANGHAI RESEARCH CENTER FOR WIRELESS COMMUNICATIONS, Shanghai (CN)

( * ) Notice: Subject to any disclaimer, the term of this patent is extended or adjusted under 35 U.S.C. 154(b) by 0 days.

(21) Appl. No.: 15/113,406

(22) PCT Filed: Jan. 23, 2015

(86) PCT No.: PCT/CN2015/071503
§ 371 (c)(1),
(2) Date: Jul. 21, 2016

(87) PCT Pub. No.: WO2015/110072
PCT Pub. Date: Jul. 30, 2015

(65) Prior Publication Data
US 2017/0013468 A1    Jan. 12, 2017

(30) Foreign Application Priority Data
Jan. 23, 2014    (CN) .......................... 2014 1 0032758

(51) Int. Cl.
*H04W 72/00*    (2009.01)
*H04W 16/14*    (2009.01)
*H04L 12/24*    (2006.01)

(52) U.S. Cl.
CPC ............. *H04W 16/14* (2013.01); *H04L 41/12* (2013.01)

(58) Field of Classification Search
USPC ......................................................... 455/454
See application file for complete search history.

(56) References Cited

U.S. PATENT DOCUMENTS

| 8,238,303 B2 | 8/2012 | Zangi |
| 9,036,518 B2 | 5/2015 | Takagi |
(Continued)

FOREIGN PATENT DOCUMENTS

| CN | 1768545 | 5/2006 |
| CN | 101600210 | 12/2009 |
(Continued)

*Primary Examiner* — Joel Ajayi
(74) *Attorney, Agent, or Firm* — Kirton McConkie; Evan R. Witt (57) ABSTRACT

Disclosed is a network frequency spectrum sharing method, a user terminal of the present network sending a network signal strength measurement report of the different network to a home base station; an operation management node of the present network, based on the network signal strength measurement report, calculating a network overlapping level indicator of the different network, and obtaining network overlapping topology-based information of the different network; and the two networks exchanging the network overlapping topology-based information, and calculating a policy for allocating shared frequency spectrum resources therebetween. The present invention can enable different networks to fairly and reasonably share frequency spectrum resources within a specified range, thus increasing a frequency spectrum utilization rate.

20 Claims, 4 Drawing Sheets

(56) References Cited

U.S. PATENT DOCUMENTS

2006/0121906 A1    6/2006   Stephens
2010/0113060 A1    5/2010   Bai

FOREIGN PATENT DOCUMENTS

| CN | 101730308 | 6/2010 |
|---|---|---|
| CN | 102378206 | 3/2012 |
| CN | 103167528 | 6/2013 |
| CN | 103249160 | 8/2013 |
| CN | 103763708 | 4/2014 |
| WO | 2010061271 | 7/2010 |
| WO | 2010107055 | 9/2010 |

METHOD FOR SHARING FREQUENCY SPECTRUM BETWEEN NETWORKS

BACKGROUND

Technical Field

The present invention relates to a method for sharing a frequency spectrum between networks, and in particular, to a method for sharing a frequency spectrum between different co-primary networks, and belongs to the field of wireless communications technologies.

Related Art

Figure 1:
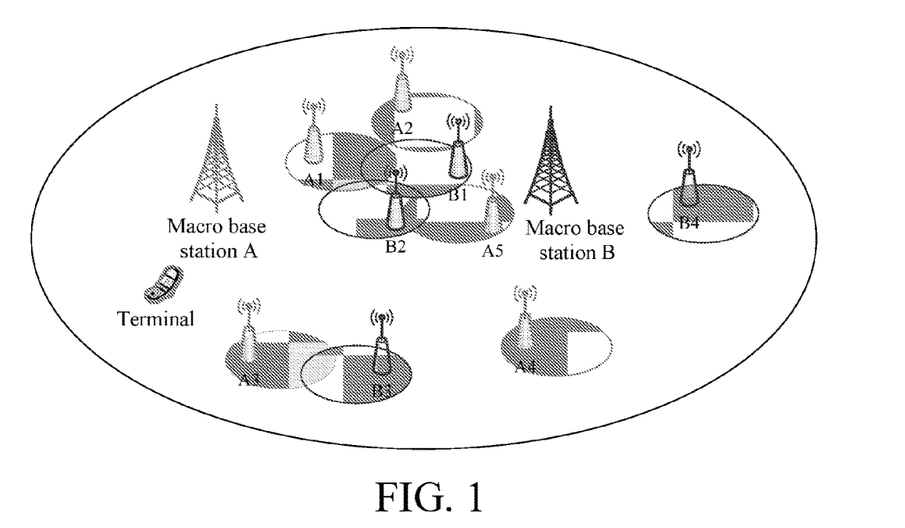
FIG. 1 is a schematic diagram showing a scenario of coverage overlapping between hybrid networks deployed by different operators in the current stage.

In recent years, heterogeneous networks (Heterogeneous Network, HetNet) draw widespread attention. A flexible networking mode of heterogeneous networks can satisfy diverse different requirements. Referring to FIG. 1, deployment of a macro cell (Macro cell) can provide wide area coverage, and deployment of a large quantity of small cells such as a micro cell (Microcell), a pico cell (Pico cell), a cell served by a home NodeB (Femto cell), and the like not only can enhance indoor coverage, but also can provide high-speed access. Compared with a macro base station, a small-cell base station has much lower transmit power. For some indoor small-cell base stations deployed, a radio signal of the base station suffers from great wall-penetration loss after penetrating a building. Consequently, under a condition that geographical locations are isolated, operators of heterogeneous networks can share a frequency spectrum while no strong interference is caused.

Co-primary spectrum sharing (Co-primary Spectrum Sharing) is a new frequency spectrum access mode, and co-primary frequency spectrum sharing that is dynamic and flexible can be implemented between different operators. It is required that two or more wireless frequency band license holders perform negotiation to agree on how to jointly use some authorized frequency bands of the holders. An entire frequency spectrum sharing mode is controlled by a national frequency band management organization. Therefore, a new mode is envisaged: A frequency band management organization no longer exclusively allocates a frequency spectrum resource to one operator, but simultaneously allocates a frequency spectrum resource to multiple potential operators (users). The potential operators (users) are required to jointly use the frequency spectrum resource fairly according to some particular rules. This new frequency spectrum using mode already starts to be discussed by organizations and institutions in the world. For example, it is involved in the discussion of allocating a 3.5 GHz frequency band in a fixed broadband wireless access (Fixed BWA) system by the German Federal Network Agency in May, 2004. In addition, a similar concept is also proposed in the "light licensing" scheme about 3650-3700 MHz by the Federal Communications Commission of America.

FIG. 1 shows a scenario of coverage overlapping between hybrid networks deployed by different operators in the current stage. Both an operator A and an operator B deploy a network in an area. A1 to A5 are five small-cell base stations deployed by the operator A, and B1 to B4 are four small-cell base stations deployed by the operator B. In the figure, coverage overlapping between networks of the two operators has three cases as follows: A degree of coverage overlapping is high; a degree of coverage overlapping is intermediate; and a degree of coverage overlapping is low, or there is no coverage overlapping. Policies used by different operators to separately deploy networks may be greatly different, and in addition, it is very difficult for different operators to exchange detailed information about network deployment, and a network topology can be estimated only according to some limited insensitive information, to determine a frequency spectrum allocation method. Therefore, if a network coverage topology deployed by different operators can be known, it is of great significance for the operators to negotiate a frequency spectrum allocation policy, and frequency spectrum utilization can be improved.

SUMMARY

In view of disadvantages in the prior art, a technical problem to be resolved in the present invention is to provide a method for sharing a frequency spectrum between networks.

To achieve the foregoing objective of the present invention, the present invention uses the following technical solutions:

A method for sharing a frequency spectrum between networks is provided, used to implement allocation of a shared frequency spectrum between a first network (A) and a second network (B), and comprising the following steps:

measuring a network signal of the second network (B);

calculating, according to the network signal of the second network (B), an indicator indicating a degree at which the first network (A) overlaps with the second network (B), and obtaining network-coverage-topology-based information of the second network (B) according to the network overlapping level indicator (V);

exchanging, by the first network (A) and the second network (B), the network-coverage-topology-based information of the second network (B), and obtaining network-coverage-topology-based information of the first network (A) from the second network (B); and calculating a frequency spectrum jointly used by the first network (A) and the second network (B).

Compared with the prior art, the present invention has the following technical features:

1. The present invention is applied to share a frequency spectrum resource between different operators/networks/users in a certain range. A shared frequency spectrum resource is reasonably allocated between different operators according to a degree at which network coverage of the different operators overlap, which implements co-primary spectrum sharing, and improves frequency spectrum utilization of an entire communications network.

2. A frequency spectrum can be fairly shared on a co-primary basis, it is ensured that different terminals in an area in which network coverage overlaps can fairly use a frequency spectrum resource, and interests of different operators are safeguarded.

3. Frequency spectrum allocation can be automatically adjusted on a co-primary basis according to different network coverage overlapping degrees, and a suitable operator is enabled to occupy a jointly used frequency spectrum that is reasonable, which has a wide application range, a simple algorithm, and high efficiency.

DETAILED DESCRIPTION

The present invention is described in further detail below with reference to accompanying drawings and specific embodiments.

A method for sharing a frequency spectrum between networks provided in the present invention is applicable to any one of 2G/3G/4G or other future wireless communications networks, co-primary spectrum sharing between multiple operators is currently not yet applied to an existing network such as 2G/3G, but the possibility that this method is applicable to 2G/3G is not excluded. Only a 4G-LTE network is used as an example below to describe a solution of sharing a frequency spectrum between different operators or different networks. The following mainly discusses a case of co-primary networks of different operators, and a case of different co-primary networks of a same operator is similar, which is not described in detail herein again.

Figure 2:
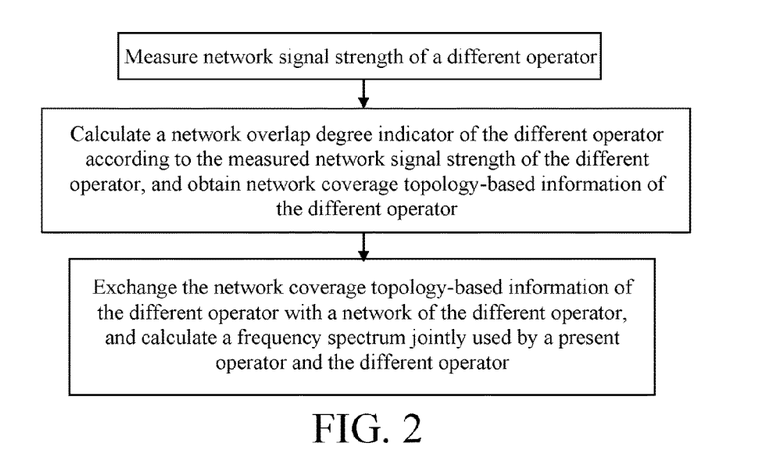
FIG. 2 is a block flowchart of implementing frequency spectrum sharing between different networks.
Figure 3:
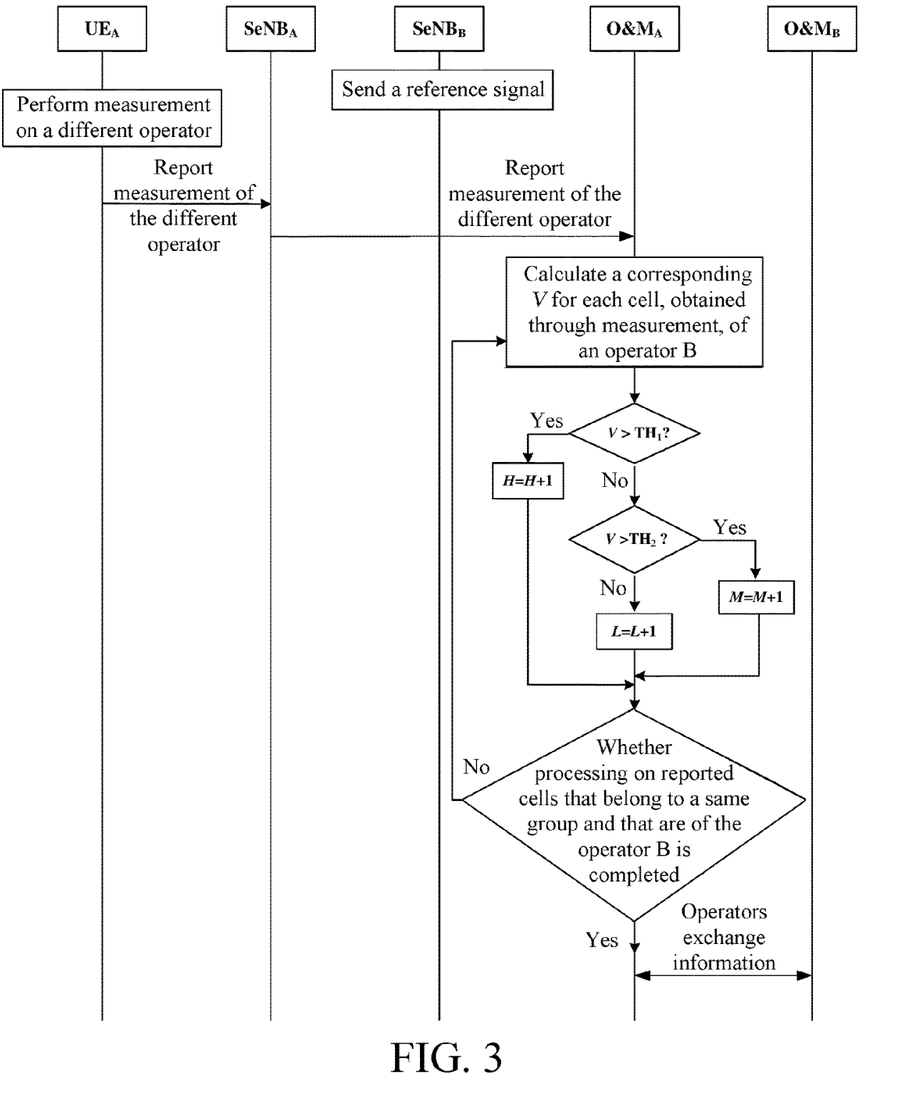
FIG. 3 is a detailed flowchart of implementing frequency spectrum sharing between different networks according to the present invention.

The method for sharing a frequency spectrum between networks is mainly applicable to co-primary networks. A reasonable frequency spectrum division solution is provided according to an inter-network coverage overlapping degree of a different operator, to share a frequency spectrum between operators/networks, which is applicable to fairly share a frequency spectrum resource between different operators/networks in a certain range on a co-primary basis. In an area in which coverage of networks overlap, an operator guides a user terminal (User Equipment, UE) to perform measurement on a different operator, where the user terminal is in the area deployed by the operator, estimates, according to a result of the measurement of the different operator, a degree at which coverage of a network deployed by another operator in the area and a network of the present operator overlap, and obtains, according to network overlapped coverage topology information, a solution for allocating a shared frequency spectrum between different operators. Referring to FIG. 2 and FIG. 3, the present invention is introduced in detail below by using a process of sharing a frequency spectrum between an operator A and an operator B as an example.

An operator classifies small cells into different groups according to geographical locations and coverage areas. When performing group classification, the operator needs to allocate a corresponding group identifier to each group. After group classification, a small cell needs to notify, to a small-cell base station, a group identifier of a group to which the small cell belongs. This method is applicable to a small cell or a macro cell, and may be selected for use according to a service requirement.

Step 1. Different networks separately perform measurement and reporting on a different operator.

A small-cell base station of an operator/a network needs to guide a user terminal of the base station to measure a network signal of a different operator. When the user terminal completes information measurement of the different operator, the user terminal needs to send, according to a predefined format, a measurement report of the different operator to the base station that serves the user terminal. After the base station receives the measurement report of the different operator from the user terminal, the base station forwards the measurement report and a group identifier to an operation and maintenance (Operation and Maintenance, O&M) node of the corresponding operator. The operation and maintenance node performs determining according to the measurement report of the different operator and the group identifier, and evaluates an overlap degree indicator (Overlap Degree Indicator) that indicates a small cell, of the different operator, within a group range that is indicated by the group identifier; and consequently, the operation and maintenance node can determine a network coverage topology of the different operator.

In an embodiment of the present invention, a first operating network/a first network A (which is referred to as a present operator below) and a second operating network/a second network (which is referred to as a different operator below) B are included. It may be understood that the so-called "present operator" and "different operator" are relative to each other, and may be exchanged. A small-cell base station of the present operator A is SeNBA, an operation and maintenance node is O&MA, and a user terminal served by SeNBA is UEA. A small-cell base station of the different operator B is SeNBB, an operation and maintenance node is O&MB, and a user terminal served by SeNBB is UEB. That SeNBA performs measurement and reporting on the different operator is introduced below.

All user terminals UEA of SeNBA perform measurement on the different operator. A user terminal $UE_A$ may initiate measurement on the different operator in multiple manners: In a first manner, measurement is performed periodically, and a measurement period is preconfigured by the base station after operators perform negotiation. In another manner, measurement may be triggered by an event, and a trigger event may be that the base station or the UE is strongly interfered. An initiating condition may be set according to a service requirement, and details are not described in detail herein.

At the same time, all user terminals UEB of SeNBB also perform measurement on the different operator. For the purpose of conciseness, FIG. 3 does not show working content of the different operator B (including a user terminal UEB, SeNBB, and the like), and a working manner and working content thereof are the same as that of the present operator A.

SeNBB is a small-cell base station of the different operator measured by UEA. The user terminal UEA measures, according to a reference signal periodically sent by SeNBB, signal strength information, that is, a reference signal received power (Reference Signal Received Power, RSRP) of a corresponding small cell served by SeNBB of the operator B, and after the measurement is completed, UEA sends a network information measurement report of the different operator to the small-cell base station to which UEA belongs. The measurement report of the different operator needs to be sent according to a defined format, and the report includes a SeNBB reference signal received power RSRP received by the user terminal UEA in the measured small cell, an operator identifier/a network identifier (operator ID) and a group identifier (group ID), and an E-UTRAN cell global identifier (E-UTRAN Cell global Identifier, ECGI). In addition, if a measured cell belongs to a closed subscriber group, a closed subscriber group identifier (CSGID) should be further included, and if a measured cell does not belong to a closed subscriber group, a closed subscriber group identifier does not need to be reported.

Step 2. Evaluate, according to a network measurement report of a different operator, an indicator that indicating a degree at which a network of a small cell of a present operator overlaps with a network of a small cell of the different operator.

In step 1, the small-cell base station of the present operator reports the network measurement report of the different operator to the operation and maintenance node to which the base station belongs. The operation and maintenance node can determine, according to different network measurement reports of the small-cell base station, a status of overlapping between a small cell of the different operator B and network coverage of the present operator A. In this embodiment, a network coverage overlap degree indicator is used to indicate a degree at which a small cell deployed by the different operator overlaps with network coverage of the present operator. The overlap degree indicator is obtained in multiple manners. Because a small cell deployed by a different operator may be detected by multiple cells deployed by the present operators, in an embodiment of the present invention, the overlap degree indicator is obtained by using a sum of neighbor relationship values that are multiplied by RSRP weights. A process of calculating the overlap degree indicator is as follows:

If a small cell of the present operator A can obtain through measurement a small cell deployed by the different operator, a reference neighbor relationship value of the small cell of the different operator B is set to 1; or if no small cell can be obtained through measurement, a reference neighbor relationship value is 0. Then, a weight value of a reference signal received power of each small cell of the different operator that is obtained through measurement is calculated. All neighbor relationship values, multiplied by weights, of the small cell of the different operator that is obtained through measurement are finally added to obtain an overlap degree indicator of the small cell. Because the reference neighbor relationship value is 1, only weight values of reference signal received powers, obtained by small-cell base stations SeNBA through measurement, of the small cell of the different operator B need to be added to obtain an overlap degree indicator of the small cell of the different operator B.

In an embodiment of the present invention, the small-cell base station SeNBA forwards, to the corresponding O&M$_A$, a measurement result of the different operator that is obtained by the user terminal UEA. O&M$_A$ calculates, according to a network signal measurement result of the different operator, an indicator that indicates a degree at which each small cell of the different operator B that is obtained through measurement overlaps with a network of the present operator A. Therefore, an indicator V that indicates a degree at which a small cell of the different operator B that is obtained through measurement overlaps with a network of the present operator is calculated by using the following formula:

$$V_x^{(B)} = \sum_{i=1}^{N} W_i. \quad (1)$$

x is a sequence number of a base station SeNBB obtained through measurement, i is a sequence number of SeNB$_A$ that has a neighbor relationship with the x$^{th}$ SeNBB, N is a quantity of SeNB$_A$ that have a neighbor relationship with the x$^{th}$ SeNBB, and Wi is a weight value that is calculated according to a reference signal received power value, reported by a user terminal of the i$^{th}$ base station SeNB$_A$ of the present operator, of the x$^{th}$ base station SeNBB of the different operator. The network overlapping level indicator V represents a degree at which a base station of the different operator B that interferes with a small cell of the present operator A interferes with a small cell of the present operator A. In formula 1, weight values are simply added, and another manner may also be used, for example, weighted summation is performed on Wi.

A weight value is directly related to a reference signal received power value obtained by a user terminal through measurement. Table 1 shows a mapping relationship between a weight value W and a reference signal received power RSRP. Some thresholds $R_1$, $R_2$, and $R_3$ are first set, and a corresponding weight value is assigned according to RSRP and threshold values. A value is assigned according to a principle that a greater reference signal received power RSRP value indicates a greater weight value. The thresholds may be autonomously set by an operator depending on situations, which is optional and is not described herein.

TABLE 1

Mapping relationship between a weight value W and a reference signal received power RSRP

| RSRP range | W value |
|---|---|
| RSRP ≥ $R_1$ | 1 |
| $R_2$ ≤ RSRP < $R_1$ | 0.8 |
| $R_3$ ≤ RSRP < $R_2$ | 0.5 |
| ... | ... |

As another mapping relationship between a weight value W and a reference signal received power RSRP, a maximum value R may be acquired according to a RSRP, obtained by user terminals UEA of different SeNB$_A$ through measurement, of the base station SeNB$_B$ of the different operator, and W$_i$=RSRP$_i$/R. When this mapping relationship is used, in an extreme case in which a degree at which network coverage of two operators overlap is very low, and a value of R is very small, a weight value W$_i$ calculated according to W$_i$=RSRP$_i$/R is still very large. To avoid this case, a threshold of R may be set, and if each RSRP obtained by a user terminal UEA of a base station SeNB$_A$ of the present operator A through measurement is less than the threshold (that is, a maximum value R is less than the threshold), it is determined that a network coverage overlapping degree is low.

Step 3. Count small cells of the different operator according to the overlap degree indicator.

In the present invention, the overlap degree indicator is an important parameter that indicates a degree at which network signals of small cells of the different operator B and the present operator A overlap. The operation and maintenance node of the present operator A classifies, into several types, small cells that are in a same network and belong to a same group, where the classification is performed based on an overlapping degree according to a value of the overlap degree indicator of the small cell of the different operator B, a network ID of the small cell, and a group ID of the small cell. A quantity of small cells included in each group is counted according to a classification status. According to quantities of small cells having different overlapping degrees, a coverage topology of a network of small cells of the different operator B that are in a group, and a network of the present operator A can be basically determined. During small cell classification, a threshold of an overlap degree indicator needs to be first defined. The threshold is used to classify different coverage overlapping levels of small cells.

Two thresholds of the overlap degree indicator are used as an example below for description. The two thresholds are separately defined as TH1 and TH2, where TH1>TH2. Therefore, small cells may be classified into three types: high, intermediate, and low according to coverage overlapping degrees by using the two thresholds. A quantity of small cells corresponding to each type is indicated by H, M, and L. If an overlap degree indicator V≥TH1, it indicates that a small cell deployed by the different operator B overlaps with network coverage of the present operator A at a high degree. In this case, 1 is added to a quantity of small cells having a high overlapping degree, that is, H=H+1, where H indicates a quantity of small cells that are deployed by the operator B and that overlap at a high degree with network coverage deployed by the present operator A. If an overlap degree indicator TH2<V<TH1, it indicates that a small cell deployed by the different operator B overlaps with network coverage of the present operator A at an intermediate degree. In this case, 1 is added to a quantity of small cells having an intermediate network coverage overlapping degree, that is, M=M+1, where M indicates a quantity of small cells that are deployed by the operator B and that overlap at an intermediate degree with network coverage deployed by the present operator A. In other cases, it is considered that a small cell of the different operator overlaps with network coverage of the present operator at a low degree. In this case, 1 is added to a quantity of small cells having a low overlapping degree, that is, L=L+1, where L indicates a quantity of small cells that are deployed by the operator B and that overlap at a low degree with network coverage deployed by the present operator A.

Setting of a threshold may be determined according to a reference signal received power RSRP, detected by the present operator A, of a small cell of the different operator B. For example, in a first solution, a maximum value in RSRPs, obtained by user terminals UEAs of different $SeNB_A$ through measurement, of the base station of the different operator is used as R, the threshold TH1 is set to a large proportion (for example, ⅔) of R, and the threshold TH2 is set to a small proportion (for example, ⅓) of R. In a second solution, a fixed threshold is set according to empirical data of the present operator A. In a third solution, the present operator A and the different operator B perform negotiation to determine a threshold in advance. In the first two solutions, the operators exchange a threshold when exchanging network-coverage-topology-based information. In the third solution, a threshold does not need to be exchanged.

Small cells of the different operator that are in a same group is processed according to the foregoing classification and counting methods, a different-operator network coverage topology of the small cells in the group can be determined, and network coverage topology information of the different operator is obtained.

Step 4. Different networks exchange network-coverage-topology-based information.

A parameter of an inter-operator coverage overlap indicator (inter-operator coverage overlap indicator) is used to indicate a degree at which coverage of different networks overlaps, and the parameter includes quantities of small cells having different network coverage overlapping degrees, that is, the quantities of small cells of the operator that are obtained according to the overlap degree indicator in step 3. After a network of the present operator A exchanges, with a network of the different operator, information of a quantity of small cells of the different operator B that overlap with the network of the present operator A at different network coverage overlapping degrees, each operator may determine, according to the exchanged information, a status of a deployed small cell that overlaps with coverage of another operator.

Operators perform exchange in two manners: First, an operation and maintenance node is used. Second, a frequency spectrum control center (spectrum controller) is used. When an operation and maintenance node is used to perform exchange, the operation and maintenance node of the operator A may send, to the operation and maintenance node of the operator B, only an inter-operator coverage overlap indicator that includes at least H and L (a case in which one threshold exists) and may include M (a case in which two thresholds exist), and details are no longer described in detail herein. When a frequency spectrum control center for making a decision on a frequency spectrum allocation solution exists in a system, an operator that needs to share a frequency spectrum sends, by using an operation and maintenance node of the operator, an inter-operator coverage overlap indicator to a frequency spectrum control center to which the operator belongs, and the frequency spectrum control center of the operator exchanges the inter-operator coverage overlap indicator.

Step 5. Negotiate, according to the network-coverage-topology-based information, a solution for sharing and allocating a frequency spectrum between operators.

An operator determines a proportion of an exclusively occupied frequency spectrum and/or a jointly used frequency spectrum of the operator according to the quantities H, M, and L, included in the exchanged information, of cells having different network coverage overlapping degrees. The operators perform negotiation to obtain an allocation proportion of a jointly used frequency band according to the proportion of an exclusively occupied frequency spectrum and/or a jointly used frequency spectrum.

Figure 4:
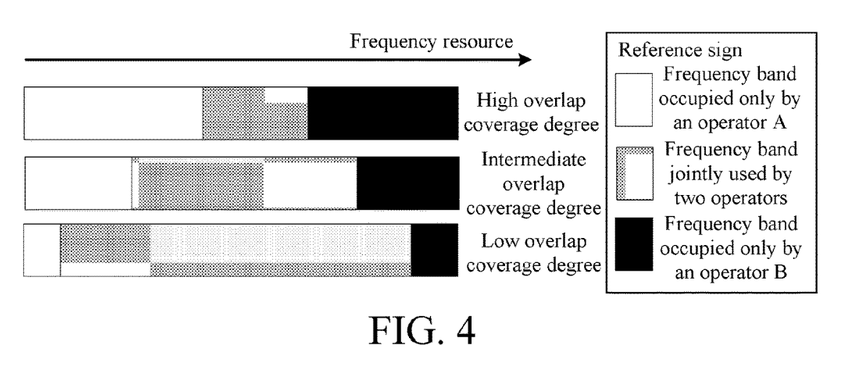
FIG. 4 is a schematic diagram of allocating a frequency spectrum in a scenario of overlapped coverage of different networks.

In this solution, frequency bands shared by the two operators are classified into three parts, which are separately: a jointly used frequency band, a frequency band occupied by only one operator (an exclusively occupied frequency spectrum of the operator A), and a frequency band occupied by the other operator (an exclusively occupied frequency spectrum of the operator B). A structure of dividing a frequency spectrum resource is shown in FIG. 4. A principle of allocating a frequency band resource is as follows: If a coverage overlapping degree between networks of different operators is higher (that is, H is greater), there are less frequency bands to be jointly used by the operators, and more frequency band resources need to be allocated to an operator for exclusive occupation, to reduce interference between the operators; otherwise, if a coverage overlapping degree between networks deployed by different operators is lower, more frequency bands may be allocated to operators for joint use, and there are less frequency bands independently occupied by the operators (also referred to as an exclusively occupied frequency spectrum).

That an operator determines a proportion of a frequency spectrum that the operator needs to exclusively occupy to a jointly used frequency spectrum is first introduced. Each operator evaluates an allocation proportion of an independently occupied frequency spectrum to a jointly used frequency spectrum according to quantities of small cells having different network coverage overlapping degrees.

When determining the proportion between the two, the operator may use different criteria according to actual cases.

Figure 5:
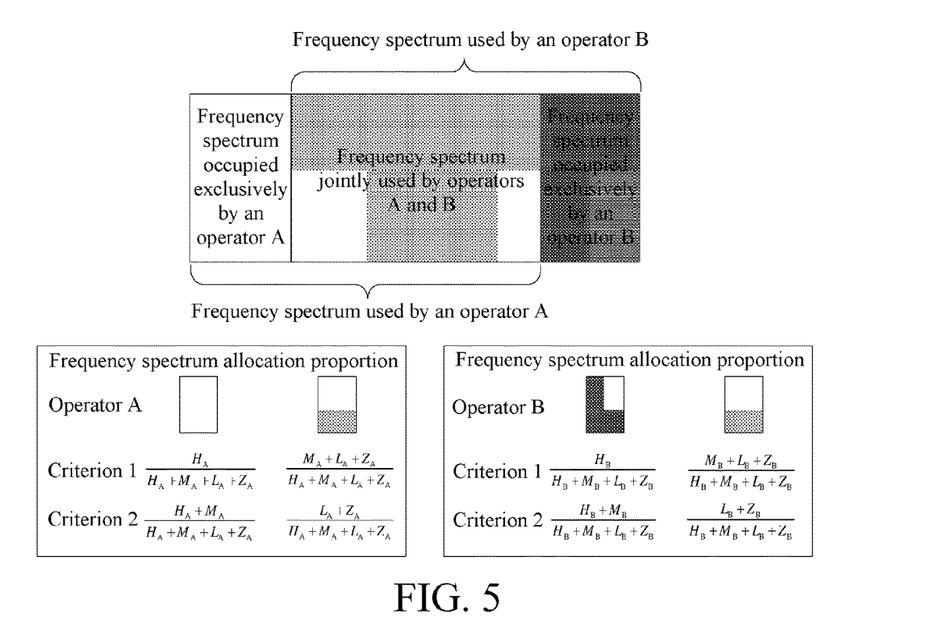
FIG. 5 is an exemplary diagram of allocating an exclusively occupied frequency spectrum and a jointly used frequency spectrum in frequency spectrums used by a first network.

In an embodiment of the present invention, for small cells deployed by the operator B, in addition to a total quantity $H_B+M_B+L_B$ of small cells of the different operator B that are obtained by the operator A through measurement and that have high, intermediate, and low network coverage overlapping degrees, some small cells of the different operator B may not be obtained by the operator A through measurement, and a quantity of these small cells is marked as $Z_B$. In this embodiment, two criteria for determining a frequency spectrum allocation proportion are provided, and are shown in FIG. 5.

After each operator obtains quantities of small cells having different inter-network coverage overlapping degrees, the operator performs allocation according to a criterion (criterion 1) of a frequency spectrum allocation proportion, that is, an allocation proportion of an exclusively occupied frequency spectrum to frequency spectrums used by the operator is $$\frac{H}{H+M+L+Z},$$

and an allocation proportion of a jointly used frequency spectrum is $$\frac{M+L+Z}{H+M+L+Z}.$$

The different operator B is used as an example, an allocation proportion of an exclusively occupied frequency spectrum to frequency spectrums used by the operator is $$\frac{H_B}{H_B+M_B+L_B+Z_B},$$

and an allocation proportion of a jointly used frequency spectrum is $$\frac{M_B+L_B+Z_B}{H_B+M_B+L_B+Z_B}.$$

Alternatively, each operator performs allocation according to another criterion (criterion 2) of a frequency spectrum allocation proportion: An allocation proportion of an exclusively occupied frequency spectrum to frequency spectrums used by the operator is $$\frac{H+M}{H+M+L+Z},$$

and an allocation proportion of a jointly used frequency spectrum to frequency spectrums used by the operator is $$\frac{L+Z}{H+M+L+Z}.$$

The different operator B is used as an example, an allocation proportion of an exclusively occupied frequency spectrum to frequency spectrums used by the operator is $$\frac{H_B+M_B}{H_B+M_B+L_B+Z_B},$$

and an allocation proportion of a jointly used frequency spectrum to frequency spectrums used by the operator is $$\frac{L_B+Z_B}{H_B+M_B+L_B+Z_B}.$$

It may be understood that if there is only one threshold, small cells of the different operator B that are obtained by the present operator A through measurement are classified into two types: high and low. An allocation proportion of an exclusively occupied frequency spectrum to frequency spectrums used by the operator B is $$\frac{H_B}{H_B+L_B} \text{ or } \frac{H_B}{H_B+L_B+Z_B}.$$

Similarly, an allocation proportion of a jointly used frequency spectrum to frequency spectrums used by the operator B is $$\frac{L_B}{H_B+L_B} \text{ or } \frac{L_B+Z_B}{H_B+L_B+Z_B}.$$

Because a case in which there is one threshold is similar to a case in which there are multiple thresholds, no description is provided separately below.

Figure 6:
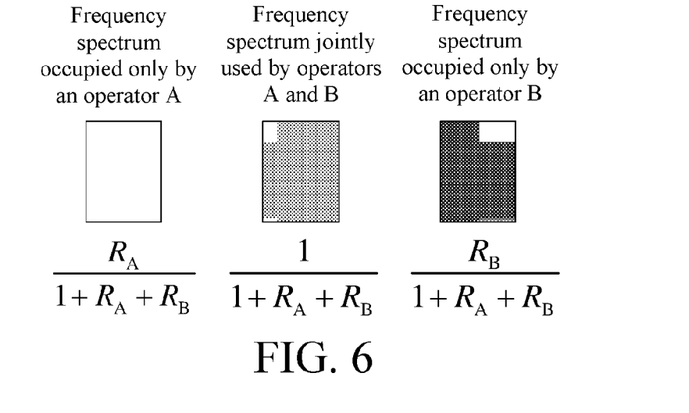
FIG. 6 is a schematic diagram of sharing and allocating a frequency spectrum between different networks.

After an operator determines a frequency spectrum allocation proportion of the operator according to a corresponding criterion, a solution for reasonably allocating a frequency spectrum between operators needs to be negotiated subsequently. FIG. 6 shows a frequency spectrum sharing and allocation proportion according to an embodiment. First, a frequency spectrum shared by two operators is defined as 1. The operator A determines that a proportion of a frequency spectrum that needs to be independently occupied by the operator A to a jointly used frequency spectrum is $R_A$, a proportion of an independently occupied frequency spectrum of the operator B to a jointly used frequency spectrum is $R_B$, the operators exchange the two proportions $R_A$ and $R_B$ (as network coverage topology information), and a solution for sharing and allocating a frequency spectrum between operators can be obtained according to allocation proportion solutions of the operators.

According to the allocation criterion 1, $$R_A = \frac{H_A}{M_A+L_A+Z_A}.$$

According to the allocation criterion 2, $$R_A = \frac{H_A + M_A}{L_A + Z_A}.$$

The foregoing criterion 1 or 2 may be further simplified as follows:

Criterion 1: A proportion of an exclusively occupied frequency spectrum of the operator A to a jointly used frequency spectrum is $$R_A = \frac{H_A}{T_A - H_A}.$$

Criterion 2: A proportion of an exclusively occupied frequency spectrum of the operator A to a jointly used frequency spectrum is $$R_A = \frac{H_A + M_A}{T_A - H_A - M_A}.$$

$H_A$ is a quantity of small cells that are known according to information exchanged by the operators, that are in small cells deployed by the operator A in a given area, and that have a high network overlapping degree; $T_A$ is a quantity of all small cells deployed by the operator A in a given area, or a quantity of all small cells that are detected by user terminals of the operator B and that are deployed by the operator A in a given area (that is, a case in which $Z_A$ is 0); and $M_A$ is a quantity of small cells that are known according to information exchanged by the operators, that are in small cells deployed by the operator A in a given area, and that have an intermediate network overlapping degree.

Correspondingly, the operator B may also determine the proportion $R_B$ of an exclusively occupied frequency spectrum of the operator B to a jointly used frequency spectrum according to criterion 1 or 2.

The operator A and the operator B exchange the proportions $R_A$ and $R_B$, obtained according to criterion 1 or 2, of a respective exclusively occupied frequency spectrum to a jointly used frequency spectrum, and consequently allocation proportions of three parts, that is, two segments of exclusively occupied frequency spectrums and a jointly used frequency spectrum, are calculated as follows: a proportion of an exclusively occupied frequency spectrum of the operator A to all frequency spectrums is $$\frac{R_A}{1 + R_A + R_B},$$

a proportion of a jointly used frequency spectrum of the operator A and the operator B to all frequency spectrums is $$\frac{1}{1 + R_A + R_B},$$

and a proportion of an exclusively occupied frequency spectrum of the operator B to all frequency spectrums is $$\frac{R_B}{1 + R_A + R_B}.$$

All frequency spectrums refer to a sum of a jointly used frequency spectrum of a present operator and a different operator, and exclusively occupied frequency spectrums of the present operator and the different operator.

As another implementation manner of step 5, a solution for reasonably allocating a frequency spectrum between operators may also be negotiated between operators according to exchanged network coverage topology information by using the following solution. In the following solution, an operator does not need to determine a proportion of a frequency spectrum that needs to be exclusively occupied by the operator to a jointly used frequency spectrum, the operator A and the operator B directly exchange total quantities of small cells deployed by the operator A and the operator B, and quantities of small cells of the opposite party that are obtained through measurement and that have different network coverage overlapping degrees (as network coverage topology information), and then directly allocate a frequency spectrum separately according to the quantities of small cells having different network coverage overlapping degrees. After operation and maintenance nodes of the operator A and the operator B separately obtain quantities of small cells that are deployed by different operators and that have different network coverage overlapping degrees, the operator A and the operator B exchange, as network coverage topology information, quantities of small cells of different operators that have different network coverage overlapping degrees, and quantities of small cells that are deployed by present operators. That is, the operator A notifies, to the operator B, a total quantity $H_A+M_A+L_A+Z_A$ of small cells deployed by the operator A, and quantities $H_B$, $M_B$, and $L_B$ of small cells of the operator B that are obtained through measurement and that have different coverage overlapping degrees; and the operator B notifies, to the operator A, a total quantity $H_B+M_B+L_B+Z_B$ of small cells deployed by the operator B, and quantities $H_A$, $M_A$, and $L_A$ of small cells of the operator A that are obtained through measurement and that have different coverage overlapping degrees. The operator A and the operator B separately allocate a frequency spectrum according to the following criterion 3. As another alternative criterion, the operator A and the operator B may also separately allocate a frequency spectrum according to the following criterion 4. Compared with criterion 1 or criterion 2, criterion 3 or criterion 4 had higher computing and exchange efficiency when criterion 3 or criterion 4 is applied.

Criterion 3:

A proportion of an exclusively occupied frequency spectrum of the operator A to all frequency spectrums is $$\frac{H_A}{H_A + M_A + L_A + Z_A + H_B + M_B + L_B + Z_B}.$$

A proportion of a jointly used frequency spectrum of the operator A and the operator B to all frequency spectrums is $$\frac{M_A + L_A + Z_A + M_B + L_B + Z_B}{H_A + M_A + L_A + Z_A + H_B + M_B + L_B + Z_B}.$$

A proportion of an exclusively occupied frequency spectrum of the operator B to all frequency spectrums is $$\frac{H_B}{H_A + M_A + L_A + Z_A + H_B + M_B + L_B + Z_B}.$$

Criterion 4:
A proportion of an exclusively occupied frequency spectrum of the operator A to all frequency spectrums is $$\frac{H_A + M_A}{H_A + M_A + L_A + Z_A + H_B + M_B + L_B + Z_B}.$$

A proportion of a jointly used frequency spectrum of the operator A and the operator B to all frequency spectrums is $$\frac{L_A + Z_A + L_B + Z_B}{H_A + M_A + L_A + Z_A + H_B + M_B + L_B + Z_B}.$$

A proportion of an exclusively occupied frequency spectrum of the operator B to all frequency spectrums is $$\frac{H_B + M_B}{H_A + M_A + L_A + Z_A + H_B + M_B + L_B + Z_B}.$$

For criteria 3 and 4, laws may be generalized as follows:
A proportion among an exclusively occupied frequency spectrum of the first network (A), an exclusively occupied frequency spectrum of the second network (B), and a jointly used frequency spectrum of the first network (A) and the second network (B) is: a quantity of small cells of the first network (A) that are obtained by the second network (B) through measurement and that have a high network coverage overlapping degree: a quantity of small cells of the second network (B) that are obtained by the first network (A) through measurement and that have a high network coverage overlapping degree: a quantity of remaining small cells in all small cells in the two networks. A proportion among the three may also be: a sum of quantities of small cells of the first network (A) that are obtained by the second network (B) through measurement and that have high and intermediate network coverage overlapping degrees: a sum of quantities of small cells of the second network (B) that are obtained by the first network (A) through measurement and that have high and intermediate network coverage overlapping degrees: a quantity of remaining small cells in all small cells in the two networks.

Assuming that quantities of all small cells of different operators that are detected by user terminals of present operator are $T_A = H_A + M_A + L_A + Z_A$ and $T_B = H_B + M_B + L_B + Z_B$, the foregoing criterion 3 or 4 may be simplified as:

Criterion 3-1:
A proportion of an exclusively occupied frequency spectrum of the operator A to all frequency spectrums is $$\frac{H_A}{T_A + T_B}.$$

A proportion of a jointly used frequency spectrum of the operator A and the operator B to all frequency spectrums is $$1 - \frac{H_A + H_B}{T_A + T_B}.$$

A proportion of an exclusively occupied frequency spectrum of the operator B to all frequency spectrums is $$\frac{H_B}{T_A + T_B}.$$

Criterion 4-1:
A proportion of an exclusively occupied frequency spectrum of the operator A to all frequency spectrums is $$\frac{H_A + M_A}{T_A + T_B}.$$

A proportion of a jointly used frequency spectrum of the operator A and the operator B to all frequency spectrums is $$1 - \frac{H_A + M_A + H_B + M_B}{T_A + T_B}.$$

A proportion of an exclusively occupied frequency spectrum of the operator B to all frequency spectrums is $$\frac{H_B + M_B}{T_A + T_B}.$$

$H_A$ is a quantity of small cells that are known according to information exchanged by the operators, that are in small cells deployed by the operator A in a given area, and that have a high network overlapping degree; $H_B$ is a quantity of small cells that are known according to information exchanged by the operators, that are in small cells deployed by the operator B in a given area, and that have a high network overlapping degree; $T_A$ is a quantity of all small cells deployed by the operator A in a given area, or a quantity of all small cells that are detected by user terminals of the operator B and that are deployed by the operator A in a given area; $T_B$ is a quantity of all small cells deployed by the operator B in a given area, or a quantity of all small cells that are detected by user terminals of the operator A and that are deployed by the operator B in a given area; $M_A$ is a quantity of small cells that are known according to information exchanged by the operators, that are in small cells deployed by the operator A in a given area, and that have an intermediate network overlapping degree; and $M_B$ is a quantity of small cells that are known according to information exchanged by the operators, that are in small cells deployed by the operator B in a given area, and that have an intermediate network overlapping degree.

When the simplified criterion 3-1 is applied, network coverage topology information exchanged by the operator A and the operator B is quantities H of detected small cells of the different operators that have a high network overlapping degree, and total quantities T of small cells deployed by present operators. That is, the operator A notifies, to the operator B, a total quantity $T_A$ of small cells deployed by the operator A, and a quantity $H_B$ of small cells of the operator B that are obtained through measurement and that have a high coverage overlapping degree; and the operator B notifies, to the operator A, a total quantity $T_B$ of small cells deployed by the operator B, and a quantity $H_A$ of small cells of the operator A that are obtained through measurement and that have a high coverage overlapping degree.

Similarly, when the simplified criterion 4-1 is applied, network coverage topology information exchanged by the operator A and the operator B is quantities H and M of detected small cells of different operators that have high and intermediate network overlapping degrees, and total quantities T of small cells deployed by present operators. That is, the operator A notifies, to the operator B, a total quantity $T_A$ of small cells deployed by the operator A, and quantities $H_B$ and $M_B$ of small cells of the operator B that are obtained through measurement and that have high and intermediate coverage overlapping degrees; and the operator B notifies, to the operator A, a total quantity $T_B$ of small cells deployed by the operator B, and quantities $H_A$ and $M_A$ of small cells of the operator A that are obtained through measurement and that have high and intermediate coverage overlapping degrees.

Considering that a jointly used frequency band is multiplexed by cells of two operators, a proportion of a jointly used frequency band does not need to be as high as that in criterion 3 and criterion 4, and in the following criterion 5 and criterion 6, a jointly used frequency band is divided more reasonably and efficiently.

Criterion 5:

A proportion of an exclusively occupied frequency spectrum of the operator A to all frequency spectrums is $$\frac{H_A}{H_A + S_1 + H_B}.$$

A proportion of a jointly used frequency spectrum of the operator A and the operator B to all frequency spectrums is $$\frac{S_1}{H_A + S_1 + H_B}.$$

A proportion of an exclusively occupied frequency spectrum of the operator B to all frequency spectrums is $$\frac{H_B}{H_A + S_1 + H_B}.$$

$S_1=\max\{M_A+L_A+Z_A, M_B+L_B+Z_B\}$ or $S_1=\max\{T_A-H_A, T_B-H_B\}$. Si indicates a maximum value of a quantity of small cells, which use a jointly used frequency band, of the operator A and the operator B, and a quantity of small cells of each operator that use a jointly used frequency band is a quantity of small cells, in small cells deployed by the operator, except small cells that overlap with network coverage of the different operator at a high degree.

Criterion 6:

A proportion of an exclusively occupied frequency spectrum of the operator A to all frequency spectrums is $$\frac{H_A + M_A}{H_A + M_A + S_2 + H_B + M_B}.$$

A proportion of a jointly used frequency spectrum of the operator A and the operator B to all frequency spectrums is $$\frac{S_2}{H_A + M_A + S_2 + H_B + M_B}.$$

A proportion of an exclusively occupied frequency spectrum of the operator B to all frequency spectrums is $$\frac{H_B + M_B}{H_A + M_A + S_2 + H_B + M_B}.$$

$S_2=\max\{L_A+Z_A, L_B+Z_B\}$ or $S_1=\max\{T_A-M_A, T_B-H_B-M_B\}$, which indicates a maximum value of a quantity of small cells, which jointly use a frequency band, of the operator A and the operator B, and which is a greater one of a sum of a quantity of small cells that are deployed by the operator A and that have a low network overlapping degree, and a quantity of small cells that are not detected by the operator B, and a sum of a quantity of small cells that are deployed by the operator B and that have a low network overlapping degree, and a quantity of small cells that are not detected by the operator A, or which may be a greater one of a quantity that is obtained by subtracting, from a quantity of small cells deployed by the operator A, quantities of small cells that have high and intermediate network overlapping degrees, and a quantity that is obtained by subtracting, from a quantity of small cells deployed by the operator B, quantities of small cells that have high and intermediate network overlapping degrees.

A proportion among an exclusively occupied frequency spectrum of the first network (A), an exclusively occupied frequency spectrum of the second network (B), and a jointly used frequency spectrum of the first network (A) and the second network (B) is: a quantity of small cells of the first network (A) that are obtained by the second network (B) through measurement and that have a high network coverage overlapping degree: a quantity of small cells of the second network (B) that are obtained by the first network (A) through measurement and that have a high network coverage overlapping degree: a maximum value of a quantity of small cells, which jointly use a frequency band, of the first network (A) and the second network (B). A proportion among the three may also be: a sum of quantities of small cells of the first network (A) that are obtained by the second network (B) through measurement and that have high and intermediate network coverage overlapping degrees: a sum of quantities of small cells of the second network (B) that are obtained by the first network (A) through measurement and that have high and intermediate network coverage overlapping degrees: a maximum value of a quantity of small cells, which jointly use a frequency band, of the first network (A) and the second network (B).

It is noteworthy that small cells deployed by each operator may further include some small cells that are not detected by a different operator (a corresponding quantity is Z), in addition to small cells (corresponding quantities are H, M, and L) that can be detected by a different operator and that have high, intermediate, and low network coverage overlapping degrees. It may be considered that these small cells that are not detected by the different operator almost do not overlap with network coverage of the different operator. In the foregoing criterion 1 to criterion 6, it is all considered that these small cells that are not detected by the different operator use a jointly used frequency band. In fact, these small cells not only can use a jointly used frequency spectrum, but also can use a dedicated frequency spectrum allocated to the different operator, while no strong interference with a network of the different operator is caused. In another aspect, the quantity X of these small cells is not very large. In comprehensive consideration of the foregoing factors, when negotiating a policy for dividing a shared frequency spectrum, operators may not consider these small cells that are not detected by the different operator, and the operators need to exchange only network coverage topology information (which includes quantities of small cells having high, intermediate, and low coverage overlapping degrees) obtained by the different operator through measurement, and do not need to know a quantity of all small cells deployed by another operator. A corresponding frequency division criterion may be described as follows:

Criterion 7: In the foregoing criterion 1 to criterion 6, regardless of actual values of $Z_A$ and $Z_B$, when a frequency spectrum allocation proportion is calculated, $Z_A$ and $Z_B$ are set to 0. In other words, in criteria 1 to 6, $T_A$ is a quantity of all small cells that are detected by user terminals of the operator B and that are deployed by the operator A in a given area, and $T_B$ is a quantity of all small cells that are detected by user terminals of the operator A and that are deployed by the operator B in a given area, which is a case in which both $Z_A$ and $Z_B$ are 0.

Specifically, the operator A and the operator B exchange quantities of small cells, which have different network coverage overlapping degrees, of different operators. That is, the operator A notifies, to the operator B, quantities $H_B$, $M_B$, and $L_B$ of cells of the operator B that are obtained by the operator A through measurement, and the operator B notifies, to the operator A, quantities $H_A$, $M_A$, and $L_A$ of cells of the operator A that are obtained by the operator B through measurement. The following uses criteria 3 and 4 as an example to describe a case in which $Z_A$ and $Z_B$ are set to 0 (which includes a case in which $Z_A$ and $Z_B$ are not 0 at the same time). The operator A and the operator B separately allocate a frequency spectrum according to the following criterion 7-1 (which corresponds to criterion 3) or the following criterion 7-2 (which corresponds to criterion 4). In all the criteria 1, 2, 5, and 6, $Z_A$ and $Z_B$ may be set to 0 (which includes a case in which $Z_A$ and $Z_B$ are not 0 at the same time), which is similar to the case of criteria 3 and 4, and is not described in detail.

Criterion 7-1:

In a case in which both $Z_A$ and $Z_B$ are 0, the operator A calculates a proportion $$\frac{H_A}{H_A + M_A + L_A + H_B + M_B + L_B}$$

of an exclusively occupied frequency spectrum of the operator A to all frequency spectrums according to quantities $H_B$, $M_B$, and $L_B$ of small cells of the operator B that are detected by the operator A, and $H_A$, $M_A$, and $L_A$ obtained by exchanging with the operator B.

As an alternative manner, in a case in which $Z_A$ is 0 and $Z_B$ is not 0, the operator A obtains a proportion $$\frac{H_A}{H_A + M_A + L_A + H_B + M_B + L_B + Z_B}$$

of an exclusively occupied frequency spectrum of the operator A to all frequency spectrums according to quantities $H_B$, $M_B$, and $L_B$ of small cells of the operator B that are detected by the operator A, and with reference to $H_A$, $M_A$, and $L_A$ obtained by exchanging with the operator B. A case in which $Z_B$ is 0 and $Z_A$ is not 0 is similar to a case in which $Z_A$ is 0 and $Z_B$ is not 0.

A proportion of a jointly used frequency spectrum of the operator A and the operator B to all frequency spectrums is $$\frac{M_A + L_A + M_B + L_B}{H_A + M_A + L_A + H_B + M_B + L_B}.$$

A proportion of an exclusively occupied frequency spectrum of the operator B to all frequency spectrums is $$\frac{H_B}{H_A + M_A + L_A + H_B + M_B + L_B}.$$

Similarly, in criterion 7-1, for all the proportion of an exclusively occupied frequency spectrum of the operator B to all frequency spectrums, and the proportion of a jointly used frequency spectrum of the operator B to all frequency spectrums, both the case in which $Z_A$ is 0 and $Z_B$ is not 0 or the case in which $Z_B$ is 0 and $Z_A$ is not 0 may exist, and details are not described in detail herein again.

Criterion 7-2:

A proportion of an exclusively occupied frequency spectrum of the operator A to all frequency spectrums is $$\frac{H_A + M_A}{H_A + M_A + L_A + H_B + M_B + L_B}.$$

A proportion of a jointly used frequency spectrum of the operator A and the operator B to all frequency spectrums is $$\frac{L_A + L_B}{H_A + M_A + L_A + H_B + M_B + L_B}.$$

A proportion of an exclusively occupied frequency spectrum of the operator B to all frequency spectrums is $$\frac{H_B + M_B}{H_A + M_A + L_A + H_B + M_B + L_B}.$$

Similarly, in criterion 7-2, for all the proportion of an exclusively occupied frequency spectrum of the present operator A to all frequency spectrums, the proportion of an exclusively occupied frequency spectrum of the different operator B to all frequency spectrums, and the proportion of a jointly used frequency spectrum to all frequency spectrums, both the case in which $Z_A$ is 0 and $Z_B$ is not 0 or the case in which $Z_B$ is 0 and $Z_A$ is not 0 may exist, and details are not described in detail herein again.

As shown in the upper figure in FIG. 5, according to the proportion of an exclusively occupied frequency spectrum of the present operator A to all frequency spectrums, the proportion of an exclusively occupied frequency spectrum of the different operator B to all frequency spectrums, and the proportion of a jointly used frequency spectrum to all frequency spectrums, the present operator A allocates, as a jointly used frequency spectrum, a frequency spectrum that is in frequency spectrums used by the present operator A and that is near to a frequency spectrum used by the different operator B, and allocates, as an exclusively occupied frequency spectrum, a frequency spectrum that is in frequency spectrums used by the present operator A and that is far from a frequency spectrum used by the different operator B. It may be understood that the present operator A may also not allocate a frequency spectrum in this manner, and may allocate a separated frequency band as a jointly used frequency spectrum or an exclusively occupied frequency spectrum according to a service requirement, as long as the foregoing criteria can be met.

In conclusion, in the method for sharing a frequency spectrum between networks provided in the present invention, co-primary spectrum sharing can be implemented between different operators. First, an operator classifies small cells into groups according to geographical locations and coverage areas, and allocates a group identifier; the operator performs measurement and reporting on a different operator; an operation and maintenance node to which the present operator belongs evaluates, according to a measurement report of the different operator, a degree at which a small cell of the different operator overlaps with a network of the present network, to obtain an overlap degree indicator of the small cell of the different operator; the operation and maintenance node classifies small cells of the different operator that are in a same group according to an overlapping coverage degree, and counts quantities of small cells having different overlapping coverage degrees, to form a network coverage overlapping indicator of the different operator; and the operators exchange the network coverage overlapping indicator of the different operator. An operator negotiates allocation of a frequency resource according to quantities of small cells having different network overlapping coverage degrees. By using the method for sharing a frequency spectrum between networks, different operators can fairly and reasonably share a frequency spectrum resource, improve frequency spectrum utilization of an entire communications network, and ensure communication quality of user terminals.

The method for sharing a frequency spectrum between networks provided in the present invention is described in detail above. Any obvious modification made to the present invention by a person of ordinary skill in the art without departing from the essential spirit of the present invention infringes patent rights of the present invention, and a corresponding legal responsibility is borne.

What is claimed is:

1. A method for sharing a frequency spectrum between networks, used to implement allocation of a shared frequency spectrum between a first network (A) and a second network (B), comprising the following steps:
   measuring a strength of a network signal of the second network (B);
   calculating a network overlapping level indicator according to the strength of the network signal of the second network (B), and obtaining network-coverage-topology-based information of the second network (B) according to the network overlapping level indicator (V), the network overlapping level indicator indicating a level at which the first network (A) overlaps with the second network (B);
   the first network (A) exchanging the network-coverage-topology-based information of the second network (B) with the second network (B), and obtaining network-coverage-topology-based information of the first network (A) from the second network (B); and
   calculating the shared frequency spectrum shared between the first network (A) and the second network (B).

2. The method for sharing a frequency spectrum between networks according to claim 1, wherein
   the network overlapping level indicator of the second network (B) indicates an interfering level from the second network (B) to the first network (A),
   the interfering level being calculated according to a reference signal received powers of a base station of the second network (B), that are detected by each of the user terminal of the first network (A).

3. The method for sharing a frequency spectrum between networks according to claim 2, wherein
   the interfering level from the second network (B) to the first network (A), is a sum of weight values Wi that are calculated according to the reference signal received powers of the base station of the second network (B), that are detected by each of the user terminal of the first network (A).

4. The method for sharing a frequency spectrum between networks according to claim 1, wherein
   the network-coverage-topology-based information of the second network (B) comprises a proportion, calculated by the first network (A) according to the network overlapping level indicator of the second network (B), of an exclusively occupied frequency spectrum of the second network (B) to a jointly used frequency spectrum.

5. The method for sharing a frequency spectrum between networks according to claim 1, wherein
   the network-coverage-topology-based information of the first network (A) comprises quantities of small cells of the first network (A) that have network overlapping level indicators belonging to different overlapping degrees, according to a network overlapping level indicator of the first network (A), and
   the network-coverage-topology-based information of the second network (B) comprises quantities of small cells of the second network (B) that have network overlapping level indicators belonging to different overlapping degrees, according to a network overlapping level indicator of the second network (B).

6. The method for sharing a frequency spectrum between networks according to claim 5, wherein
   the quantities of the small cells of the second network (B) that have network overlapping level indicators belonging to different overlapping degrees are obtained according to the following steps:
   defining a threshold for classifying network overlapping degrees of the second network (B);
   classifying all small cells that belong to a same base station of the second network (B), based on the threshold, according to a value of the network overlapping level indicator of the second network (B); and
   counting a quantity of each type of small cells of the second network (B), to obtain the quantities of the small cells of the second network (B) that have network overlapping level indicators belonging to different overlapping degrees.

7. The method for sharing a frequency spectrum between networks according to claim 5, wherein
   the quantities of the small cells of the second network (B) comprise at least a quantity of small cells having a high network overlap indicator; and a proportion of an exclusively occupied frequency spectrum of the second network (B) to all frequency spectrums, is a proportion of the quantity of the small cells having a high network overlap indicator, to a sum of a quantity of all small cells of the second network (B) that are detected by the user terminals of the first network (A) and a quantity of small cells deployed by the first network (A); or a proportion of an exclusively occupied frequency spectrum of the second network (B) to all frequency spectrums is a proportion of the quantity of the small cells having a high network overlap indicator, to a sum of a quantity of small cells deployed by the second network (B) and a quantity of small cells deployed by the first network (A).

8. The method for sharing a frequency spectrum between networks according to claim 5, wherein
the quantities of the small cells of the first network (A) comprise at least a quantity $H_A$ of small cells having a high network overlap indicator,
the quantities of the small cells of the second network (B) comprise at least a quantity $H_B$ of small cells having a high network overlap indicator; and
a proportion of an exclusively occupied frequency spectrum of the second network (B) to all frequency spectrums is $$\frac{H_B}{H_A + S_1 + H_B},$$

wherein
$S_1 = \max\{T_A - H_A, T_B - H_B\}$, $T_A$ is a quantity of all small cells deployed by the first network (A) in a given area, and $T_B$ is a quantity of all small cells deployed by the second network (B) in a given area.

9. The method for sharing a frequency spectrum between networks according to claim 5, wherein
the quantities of the small cells of the first network (A) comprise at least a quantity $H_A$ of small cells having a high network overlap indicator,
the quantities of the small cells of the second network (B) comprise at least a quantity $H_B$ of small cells having a high network overlap indicator; and
a proportion of a jointly used frequency spectrum of the first network (A) and the second network (B) to all frequency spectrums is:

$$\frac{S_1}{H_A + S_1 + H_B},$$

wherein
$S_L = \max\{T_A - H_A, T_B - H_B\}$, $T_A$ quantity of all small cells deployed by the first network (A) in a given area, and $T_B$ is a quantity of all small cells deployed by the second network (B) in a given area.

10. The method for sharing a frequency spectrum between networks according to claim 5, wherein
the quantities of the small cells of the second network (B) comprise at least a quantity $H_B$ of small cells having a high network overlap indicator; and
a proportion of an exclusively occupied frequency spectrum of the second network (B) to the jointly used frequency spectrum is $$\frac{H_B}{T_B - H_B},$$

wherein
$T_B$ is a quantity of all small cells of the second network (B) that are detected by the user terminals of the first network (A), or a quantity of all small cells deployed by the second network (B) in a given area.

11. The method for sharing a frequency spectrum between networks according to claim 6, wherein
the threshold comprises a first threshold and a second threshold;
the quantities of the small cells of the second network (B) comprises a quantity $H_b$ of small cells whose network overlap indicator is greater than or equal to the first threshold, and a quantity $M_B$ of small cells whose network overlap indicator is greater than the second threshold and is less than the first threshold; and
a proportion of an exclusively occupied frequency spectrum of the second network (B) to all frequency spectrums is $$\frac{H_B + M_B}{T_A + T_B},$$

wherein
$T_A$ is a quantity of all small cells of the first network (A) that are detected by user terminals of the second network (B), or a quantity of all small cells deployed by the first network (A) in a given area; and $T_B$ is a quantity of all small cells of the second network (B) that are detected by user terminals of the first network (A), or a quantity of all small cells deployed by the second network (B) in a given area.

12. The method for sharing a frequency spectrum between networks according to claim 6, wherein
the threshold comprises a first threshold and a second threshold;
the quantities of the small cells of the second network (B) comprises a quantity $H_B$ of small cells whose network overlap indicator is greater than or equal to the first threshold, and a quantity $M_B$ of small cells whose network overlap indicator is greater than the second threshold and is less than the first threshold; and
a proportion of an exclusively occupied frequency spectrum of the second network (B) to the jointly used frequency spectrum is $$\frac{H_B + M_B}{T_B - H_B - M_B},$$

wherein
$T_B$ is a quantity of all small cells of the second network (B), that are detected by the user terminals of the first network (A), or a quantity of all small cells deployed by the second network (B) in a given area.

13. The method for sharing a frequency spectrum between networks according to claim 6, wherein
the quantities of the small cells of the first network (A) comprise at least a quantity $H_A$ of small cells having a high network overlap indicator and a quantity $M_A$ of small cells having an intermediate network overlap indicator;

the quantities of the small cells of the second network (B) comprise at least a quantity $H_B$ of small cells having a high network overlap indicator and a quantity $M_B$ of small cells having an intermediate network overlap indicator; and a proportion of a jointly used frequency spectrum of the first network (A) and the second network (B) to all frequency spectrums is:

$$\frac{S_2}{H_A + M_A + S_2 + H_B + M_B},$$

wherein
$S_1 = \max\{T_A - H_A - M_A, T_B - H_B - M_B\}$, $T_A$ is a quantity of all small cells deployed by the first network (A) in a given area, and $T_B$ is a quantity of all small cells deployed by the second network (B) in a given area.

14. The method for sharing a frequency spectrum between networks according to claim 6, wherein
the threshold comprises a first threshold and a second threshold;
the quantities of the small cells of the first network (A) comprise at least a quantity $H_A$ of small cells whose network overlap indicator is greater than or equal to the first threshold, a quantity $M_A$ of small cells whose network overlap indicator is less than the first threshold and is greater than or equal to the second threshold, a quantity $L_A$ of small cells whose network overlap indicator is less than the second threshold, and a quantity $Z_A$ of small cells of the first network (A) that are not detected by the second network (B);
the quantities of the small cells of the second network (B) comprise at least a quantity $H_B$ of small cells whose network overlap indicator is greater than or equal to the first threshold, a quantity $M_B$ of small cells whose network overlap indicator is less than the first threshold and is greater than or equal to the second threshold, a quantity $L_B$ of small cells whose network overlap indicator is less than the second threshold, and a quantity $Z_B$ of small cells of the second network (B) that are not detected by the first network (A); and
a proportion of a jointly used frequency spectrum of the first network (A) and the second network (B) to all frequency spectrums is:

$$\frac{M_A + L_A + Z_A + M_B + L_B + Z_B}{H_A + M_A + L_A + Z_A + H_B + M_B - L_B + Z_B},$$

wherein values of $Z_A$ and $Z_B$ may be 0, wherein all frequency spectrums refer to a sum of a jointly used frequency spectrum of the first network and the second network, and exclusively occupied frequency spectrums of the first network and the second network.

15. The method for sharing a frequency spectrum between networks according to claim 1, wherein
the quantities of the small cells of the first network (A) comprise at least a quantity $H_A$ of small cells having a high network overlap indicator,
the quantities of the small cells of the second network (B) comprise at least a quantity $H_B$ of small cells having a high network overlap indicator; and
a proportion of a jointly used frequency spectrum of the first network (A) and the second network (B) to all frequency spectrums is:

$$\frac{R_A}{1 + R_A + R_B},$$

wherein $$R_A = \frac{H_A}{T_A - H_A} \text{ and } R_B = \frac{H_B}{T_B - H_B},$$

wherein $T_A$ is a quantity of all small cells of the first network (A) that are detected by the user terminals of the second network (B), or a quantity of all small cells deployed by the first network (A) in a given area; and $T_B$ is a quantity of all small cells of the second network (B) that are detected by user terminals of the first network (A), or a quantity of all small cells deployed by the second network (B) in a given area; and
all frequency spectrums refer to a sum of a jointly used frequency spectrum of the first network and the second network, and exclusively occupied frequency spectrums of the first network and the second networks.

16. The method for sharing a frequency spectrum between networks according to claim 1, wherein
the weight value Wi and a reference signal received power $RSRP_i$ value of an $x^{th}$ base station of the second network (B) obtained through measurement, satisfy the following relationship: $W_i = RSRP_i/R$, wherein R is a maximum value of the reference signal received power RSRP values of base stations of the different networks obtained through measurement.

17. The method for sharing a frequency spectrum between networks according to claim 1, wherein
a mapping relationship between a weight value Wi and a reference signal received power $RSRP_i$ value of an $x^{th}$ base station of the second network (B), obtained through measurement, is that the weight value Wi is correspondingly assigned to the $RSRP_i$ according to relative values of the $RSRP_i$ and multiple preset thresholds, wherein the greater the reference signal received power value greater is, the greater the weight value $W_i$ is.

18. The method for sharing a frequency spectrum between networks according to claim 1, wherein a method for determining allocation of a shared frequency spectrum is:
a proportion of an exclusively occupied frequency spectrum of the first network (A) to all frequency spectrums is $$\frac{R_A}{1 + R_A + R_B};$$

a proportion of a jointly used frequency spectrum to all frequency spectrums $$\frac{1}{1 + R_A + R_B};$$

and
a proportion of an exclusively occupied frequency spectrum of the second network (B) to all frequency spectrums is $$\frac{R_B}{1+R_A+R_B},$$

wherein $R_A$ is a proportion of the exclusively occupied frequency spectrum of the first network (A) to the jointly used frequency spectrum, and $R_B$ is a proportion of the exclusively occupied frequency spectrum of the second network (B) to the jointly used frequency spectrum.

19. The method for sharing a frequency spectrum between networks according to claim 1, wherein a proportion among an exclusively occupied frequency spectrum of the first network (A), an exclusively occupied frequency spectrum of the second network (B), and a jointly used frequency spectrum of the first network (A) and the second network (B) is X:Y:Z, wherein X is a quantity of small cells of the first network (A) that are measured by the second network (B) and that have a high network overlapping level, Y is a quantity of small cells of the second network (B) that are measured by the first network (A) and that have a high network coverage overlapping level, Z is a quantity of remaining small cells in all small cells in the first network and second networks; or X is a sum of quantities of small cells of the first network (A) that are measured by the second network (B) and that have high and intermediate network overlapping levels, Y is a sum of quantities of small cells of the second network (B) that are measured by the first network (A) and that have high and intermediate network coverage overlapping levels, Z is a quantity of remaining small cells in all small cells in the first network and second networks, wherein all frequency spectrums refer to a sum of a jointly used frequency spectrum of the first network and the second network, and exclusively occupied frequency spectrums of the first network and the second network.

20. The method for sharing a frequency spectrum between networks according to claim 1, wherein a proportion among an exclusively occupied frequency spectrum of the first network (A), an exclusively occupied frequency spectrum of the second network (B), and a jointly used frequency spectrum of the first network (A) and the second network (B) is X:Y:Z, wherein:

X is a quantity of small cells of the first network (A) that are measured by the second network (B) and that have a high network overlapping level, Y is a quantity of small cells of the second network (B) that are measured by the first network (A) and that have a high network coverage overlapping, Z is a maximum value of a quantity of small cells, which jointly use a frequency band, of the first network (A) and the second network (B); or X is a sum of quantities of small cells of the first network (A) that are measured by the second network (B) and that have high and intermediate network overlapping levels, Y is a sum of quantities of small cells of the second network (B) that are measured by the first network (A) and that have high and intermediate network coverage overlapping levels, Z is a maximum value of a quantity of small cells, which jointly use a frequency band, of the first network (A) and the second network (B).

\* \* \* \* \*